(No Model.)

H. B. SORTOR.
TWO WHEELED VEHICLE.

No. 326,168. Patented Sept. 15, 1885.

Witnesses.
John C. Perkins
Ben O. Bush

Inventor
Hobart B. Sortor
By Lucius C. West
Att'y.

N. PETERS, Photo-Lithographer, Washington, D. C.

UNITED STATES PATENT OFFICE.

HOBART B. SORTOR, OF KALAMAZOO, MICHIGAN.

TWO-WHEELED VEHICLE.

SPECIFICATION forming part of Letters Patent No. 326,168, dated September 15, 1885.

Application filed January 16, 1885. (No model.)

*To all whom it may concern:*

Be it known that I, HOBART B. SORTOR, a citizen of the United States, residing at Kalamazoo, county of Kalamazoo, State of Michigan, have invented a new and useful Two-Wheeled Vehicle, of which the following is a specification.

This invention has for its object certain improvements in construction and arrangement of parts, designed to facilitate the manufacture and use.

Figure 1:
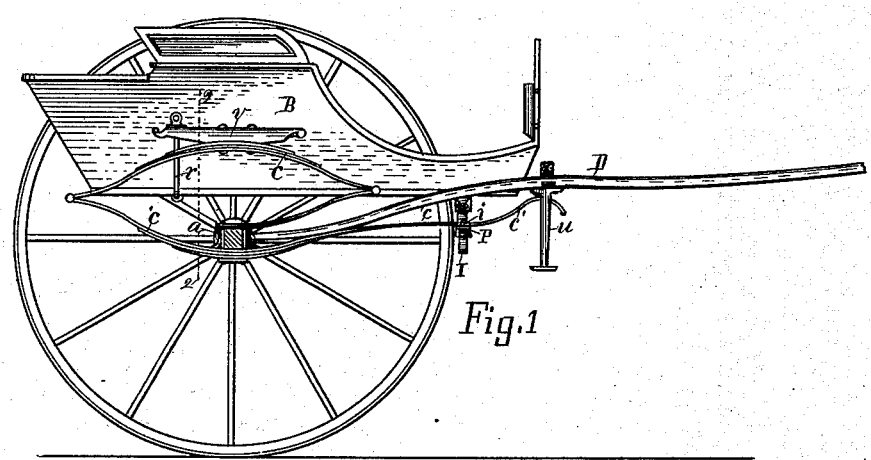
Figure 2:
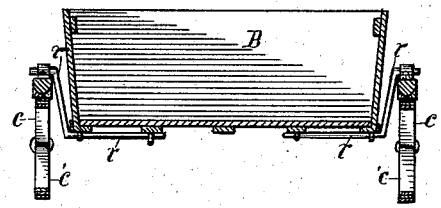
Figure 3:
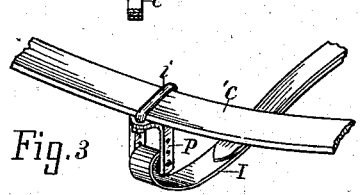
Figure 4:
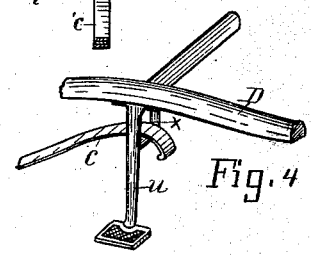
Figure 5:
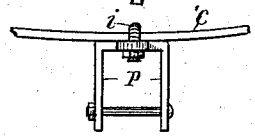
Figure 6:
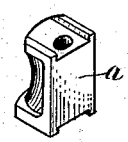

In the drawings forming a part of this specification, Figure 1 is a side elevation, the axle being in cross-section, removing one wheel. Fig. 2 is a vertical section on line 2 2 in Fig. 1, looking from a point at the left hand of said figure. Figs. 3, 4, and 6 are details of Fig. 1 in enlarged perspective; and Fig. 5 is a side elevation, enlarged, of a detail of Figs. 1 and 3.

Referring to the drawings and the letters marked thereon, B is the body, and D the thill, of a two-wheeled vehicle, commonly known as "road-carts." The construction in Fig. 1 is of course alike on both sides of the cart, and with this understanding no top view is necessary. The side springs are elliptic, with a change in the lower ellipse, $c'$, which is severed, one free end being secured on top of the axle, the other extended forward, as at $c''$, and loosely passed through a loop, $x$, Fig. 4, secured to the thill D on the under side. The usual bolster-spring, I, connects the extensions $c'$ of the side springs and supports the forward portion of the body B.

P is a coupling secured to the side springs by confining-clips $i$. The coupling has a series of holes in the side bars for the adjustable insertion of the pin or bolt which sustains the bolster-spring by passing through an eye in the end thereof, Figs. 3 and 5. Each side of the axle, between the springs engaging the upper and lower side thereof, are brace-blocks $a$, Fig. 6, having a vertical hole for the insertion of securing-bolt passed down through it and the springs, and a recess or channel in the top and bottom for the reception of the bars of the spring. These recesses serve to hold the blocks and springs true in place.

On the upper ellipse of the side springs, $c$, are secured supporting-beams $v\ v$, Figs. 1 and 2, bearing eyes on the rear end, into which eyes the upper elbow of the double-elbowed suspending-rods $r\ r$ is loosely inserted. The lower elbow of these rods extends under the body B at the rear of the axle, said ends being inserted through loops on the under side of the body, as in Fig. 2.

Such a construction is cheap and simple to make, a better and more comfortable action of the body is secured, and a less liability of any horse motion being imparted to said body.

Having thus described my invention, what I claim as new and desire to secure is—

1. The combination, with the body, axle, and thills having the spring-supporting loops, of elliptical side springs, the lower part being severed and the rear half thereof extended forward through said loops, substantially as set forth.

2. The combination of the body, axle, thills having spring-supporting loops, elliptical side springs, the lower part severed, the forward half thereof secured on top of the axle, the lower half secured on under side of axle and extended forward through said loops, and the brace-blocks having the end recesses, substantially as set forth.

3. A vehicle-spring consisting of the upper and lower ellipse, the latter being substantially centrally severed, and the rear half thereof provided with the forward extension, substantially as set forth.

In testimony of the foregoing I have hereunto subscribed my name in presence of two witnesses.

HOBART B. SORTOR.

Witnesses:
 BEN. O. BUSH,
 GEO. D. B. HALL.